US012725518B2

(12) United States Patent
Zhang et al.

(10) Patent No.: US 12,725,518 B2
(45) Date of Patent: Sep. 1, 2026

(54) MULTI-STAGE OCCUPANT AWARENESS FOR EXPECTED CRITICAL ACTIONS AT RESPECTIVE DISTANCES BASED ON FAVORABILITY AND FEASIBILITY METRICS

(71) Applicant: GM GLOBAL TECHNOLOGY OPERATIONS LLC, Detroit, MI (US)

(72) Inventors: Sycamore Zhang, Shanghai (CN); Jimmy Qi, Shanghai (CN); Zhengyu Xing, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/785,161

(22) Filed: Jul. 26, 2024

(65) Prior Publication Data

US 2025/0378758 A1 Dec. 11, 2025

(30) Foreign Application Priority Data

Jun. 5, 2024 (CN) ......................... 202410725019.6

(51) Int. Cl.
*G08G 1/16* (2006.01)
*G08G 1/0967* (2006.01)

(52) U.S. Cl.
CPC ......... *G08G 1/096766* (2013.01); *G08G 1/16* (2013.01)

(58) Field of Classification Search
CPC ........................... G08G 1/096766; G08G 1/16
USPC ........................................................ 701/117
See application file for complete search history.

(56) References Cited

U.S. PATENT DOCUMENTS

2015/0142207 A1* 5/2015 Flehmig ............. G01C 21/3492 701/1
2023/0282109 A1* 9/2023 Monteuuis ....... G08G 1/096791

FOREIGN PATENT DOCUMENTS

DE 102013223428 A1 5/2015
DE 102018122975 A1 12/2018

OTHER PUBLICATIONS

German Office Action from counterpart DE1020241220406, dated Oct. 18, 2024.

* cited by examiner

*Primary Examiner* — Gene O Crawford

(57) ABSTRACT

A driving assistance system of a host vehicle is disclosed. The driving assistance system includes: a telematics module configured to receive messages from one or more network devices separate from the host vehicle; a driving assistance module configured to receive on-board sensor data; and an awareness module configured to i) determine a critical action to perform, ii) determine a series of favorability and feasibility metric evaluation points (FFEPs), iii) based on the messages and the on-board sensor data, evaluate and rank favorability and feasibility metrics for each of the FFEPs to determine a highest ranking FFEP, and iv) based on the highest ranking FFEP, notify an occupant of the host vehicle of the critical action expected to be performed and information regarding the critical action.

19 Claims, 7 Drawing Sheets

MULTI-STAGE OCCUPANT AWARENESS FOR EXPECTED CRITICAL ACTIONS AT RESPECTIVE DISTANCES BASED ON FAVORABILITY AND FEASIBILITY METRICS

CROSS-REFERENCE TO RELATED APPLICATIONS

This application claims the benefit of Chinese Patent Application No. 2024107250196, filed on Jun. 5, 2024.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to perception systems for describing and responding to environmental situations, and more particularly to vehicle driving assistance systems for performing critical actions to achieve corresponding benefits.

A host vehicle can include object detection, collision warning, and perception systems for evaluating an environment including detecting impending objects and performing countermeasures and/or taking evasive action to prevent a collision. The vehicle can include various sensors for detecting objects, such as other vehicles, pedestrians, cyclists, etc. A controller determines locations of the objects relative to the host vehicle and trajectories of the objects and the host vehicle. If it is determined that the host vehicle is likely to collide with one of the objects, a warning signal may be generated and/or the controller may perform some other countermeasure (e.g., decelerate the vehicle, apply the brakes, change a steering angle of the vehicle, etc.) to prevent the collision.

A host vehicle may also include various display devices to provide information regarding an environment (e.g., information regarding detected objects) and to provide vehicle status and infotainment information (e.g., vehicle speed, a radio station, a speed limit, an exterior temperature, etc.). Some example display devices are flat panel displays, projection displays, and head-up displays. A vehicle may include multiple display devices to display various information to vehicle occupants (or observers).

SUMMARY

A driving assistance system of a host vehicle is disclosed. The driving assistance system includes: a telematics module configured to receive messages from one or more network devices separate from the host vehicle; a driving assistance module configured to receive on-board sensor data; and an awareness module configured to i) determine a critical action to perform, ii) determine a series of favorability and feasibility metric evaluation points (FFEPs), iii) based on the messages and the on-board sensor data, evaluate and rank favorability and feasibility metrics for each of the FFEPs to determine a highest ranking FFEP, and iv) based on the highest ranking FFEP, notify an occupant of the host vehicle of the critical action expected to be performed and information regarding the critical action.

In other features, the awareness module is configured to i) determine at least one benefit for performing the critical action, and ii) inform the occupant of the at least one benefit.

In other features, the messages include at least one of i) key impacting traffic participant information (KITPI), and ii) macroscopic traffic flow information (MTFI). The awareness module is configured to evaluate and rank the favorability and feasibility metrics based on the at least one of the KITPI and the MTFI.

In other features, the on-board sensor data includes at least one of i) KITPI, and ii) MTFI. The awareness module is configured to evaluate and rank the favorability; and feasibility metrics based on the at least one of the KITPI and the MTFI.

In other features, the awareness module is configured to implement a three-stage notification process including i) providing first notification when the host vehicle is at a first distance from the highest ranking FFEP, ii) providing second notification when the host vehicle is at a second distance from the highest ranking FFEP, and iii) providing a third notification when the host vehicle is at a third distance from the highest ranking FFEP. The second notification is different than the first notification and the third notification. The third notification is different than the first notification. The second distance is shorter than the first distance. The third distance is shorter than the second distance.

In other features, the first notification includes the critical action expected to be performed and an illustration of the highest ranking FFEP. The second notification includes request for attention associated with high likelihood that the host vehicle is to reach the highest ranking FFEP. The third notification includes a request for imminent action of occupant or a warning about action being performed by the driving assistance system.

In other features, the awareness module is configured to: determine one or more cutoff conditions for the critical action; and based on whether the one or more critical actions have been satisfied, determine a benefit anticipation location for the critical action and initialize determination of the series of FFEPs.

In other features, the awareness module is configured to update the series of FFEPs based on favorability and feasibility metrics of the series of FFEPs.

In other features, the awareness module is configured to iteratively update the critical action based on whether a previous critical action has been performed or one or more cutoff conditions have been satisfied.

In other features, the awareness module is configured to evaluate which location is best to carry out the critical action based on iterative evaluation of the favorability and feasibility metrics.

In other features, a driving assistance method for a host vehicle is disclosed. The driving assistance method includes: receiving messages at the host vehicle from one or more network devices separate from the host vehicle; receiving on-board sensor data at a control module of the host vehicle; determining a critical action to perform; determining a series of favorability and feasibility metric evaluation points (FFEPs); based on the messages and the on-board sensor data, evaluating and ranking favorability and feasibility metrics for each of the FFEPs to determine a highest ranking FFEP; and based on the highest ranking FFEP, notifying an occupant of the host vehicle of the critical action expected to be performed and information regarding the critical action.

In other features, the driving assistance method further includes: determining at least one benefit for performing the critical action; and informing the occupant of the at least one benefit.

In other features, the messages include at least one of i) KITPI, and ii) MTFI; and the favorability and feasibility metrics are evaluated and ranked based on the at least one of the KITPI and the MTFI.

In other features, the on-board sensor data includes at least one of i) KITPI, and ii) MTFI; and the favorability; and feasibility metrics are evaluated and ranked based on the at least one of the KITPI and the MTFI.

In other features, the driving assistance method further includes implementing a three-stage notification process including i) providing first notification when the host vehicle is at a first distance from the highest ranking FFEP, ii) providing second notification when the host vehicle is at a second distance from the highest ranking FFEP, and iii) providing third notification when the host vehicle is at a third distance from the highest ranking FFEP. The second notification is different than the first notification and the third notification. The third notification is different than the first notification. The second distance is shorter than the first distance. The third distance is shorter than the second distance.

In other features, the first notification includes the critical action expected to be performed and an illustration of the highest ranked FFEP. The second notification includes request for attention associated with high likelihood that the host vehicle is to reach the highest ranked FFEP. The third notification includes a request for imminent action of occupant or a warning about action being performed by a driving assistance system of the host vehicle.

In other features, the driving assistance method further includes: determining one or more cutoff conditions for the critical action; and based on whether the one or more critical actions have been satisfied, determining a benefit anticipation location for the critical action and initializing determination of the series of FFEPs.

In other features, the driving assistance method further includes updating the series of FFEPs based on favorability and feasibility metrics of the series of FFEPs.

In other features, the driving assistance method further includes iteratively updating the critical action based on whether a previous critical action has been performed or one or more cutoff conditions have been satisfied.

In other features, the driving assistance method further includes evaluating which location is best to carry out the critical action based on iterative evaluation of the favorability and feasibility metrics.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
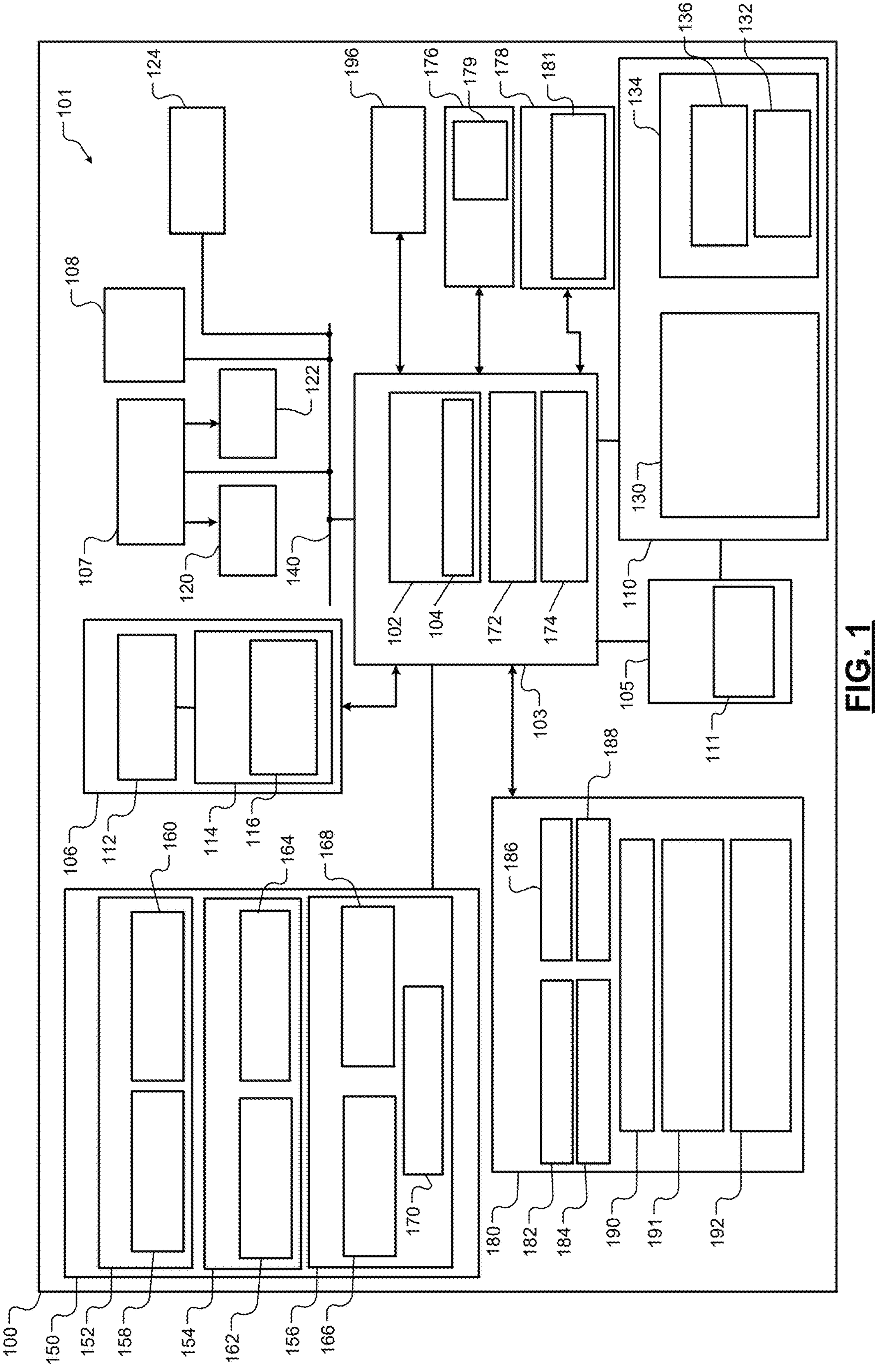
FIG. 1 is a functional block diagram of a host vehicle including an example advanced driver assist system (ADAS) with a driving assistance module and awareness module in accordance with the present disclosure.

A driver assistance system may perform automated driving operations such as steering, braking, accelerating, and decelerating operations and/or provide directions to a driver based on an intended trajectory of a corresponding host vehicle. The driver assistance system, based on outputs from sensors, detect objects and perform operations to avoid a collision. This may include informing a driver of the impending objects such that the driver can take action to avoid a collision. Traditional driver assistance systems typically provide limited information to a driver. This information may include, for example, object location and identification information, speed limits, routing directions, etc.

The examples set forth herein include an ADAS that is configured to determine critical actions to be performed to provide corresponding advantages (e.g., time savings, fuel savings, gain right of way, minimize length of path followed, ability to make a green light before it changes to red, etc.). As used herein the term "critical action" refers to an action to be performed by a host vehicle to achieve an expected benefit. Some example critical actions are a passing maneuver, a lane change, a turn, waiting for another vehicle to pass, etc. As used herein a "benefit" refers to an advantage gained by performing the critical action. Some example benefits are reduced travel time, ability to make a turn, making it through an intersection before a traffic light of the intersection changes from green to red, etc.

The ADAS determines a series of FFEPs for each critical action considered, evaluates the FFEPs based on key impacting traffic participants information (KITPI) and macroscopic traffic flow information (MTFI), ranks and updates the FFEPs, and notifies a host vehicle occupant of the critical action expected to be performed and/or being performed, the expected benefit of the critical action, and expected location when the critical action will be performed and/or completed.

KITPI may include speed, acceleration, lane position, steering angle of the host vehicle and surrounding vehicles relevant to a critical action expected to be performed by the host vehicle. MTFI may indicate how populated with vehicles is an area of interest forward of and within an intermediate set distance of a host vehicle. MTFI may also include statistical results of lane change actions of vehicles, trends of vehicle numbers and flow densities per lane, and/or other traffic flow information.

The examples include an approach to optimize the awareness of a driver and/or occupant of a host vehicle of a driver's or ADAS's maneuvering decision, based on evaluating a series of spatial points for favorability and feasibility metrics within some intermediate distance ahead of the host vehicle. The optimal location to perform the critical action from the driver or the system is determined based on the metric results of the spatial points, which are iteratively evaluated according to the KITPI and MTFI acquired from connectivity messages and/or onboard sensors. The connectivity messages may include message between vehicles including the host vehicle, between the host vehicle and a network, between the host vehicle and a cloud-based network device, between the host vehicle and a back office, and/or between the host vehicle and other network devices. In an embodiment, the ADAS includes an awareness module that implements one or more neural networks and uses one or more deep learning models to calculate favorability and feasibility metrics. This may include determining resource allocation. The example implementations are accurate and predictable, thereby guiding a driver to make appropriate and better decisions and/or making the ADAS's maneuvering decisions more explainable to the driver and/or occupant.

The examples include three stages of notifications for making the maneuvering decisions (of the automated driving system and/or indications from the driver) more explainable and timelier. The benefits of the maneuvers are also indicated to the driver and/or occupant. The notifications are provided based on the calculation of the favorability and feasibility metrics for a dynamic series of spatial points. The series of spatial points for a current iteration of an iterative evaluation of the favorability and feasibility metrics is dynamically selected based on the metric results from a previous iteration of the iterative evaluation. This is done to optimally allocate computing power toward the awareness optimization objective. The calculation of the favorability and feasibility metrics in each iteration is based on the relevant KITPI and MTFI parsed from and/or determined based on the data from connectivity messages and/or onboard sensors. In an embodiment, the KITPI is the dominant input for the calculation and the MTFI is applied for minor corrections to the results provided using the KITPI.

Figure 2:
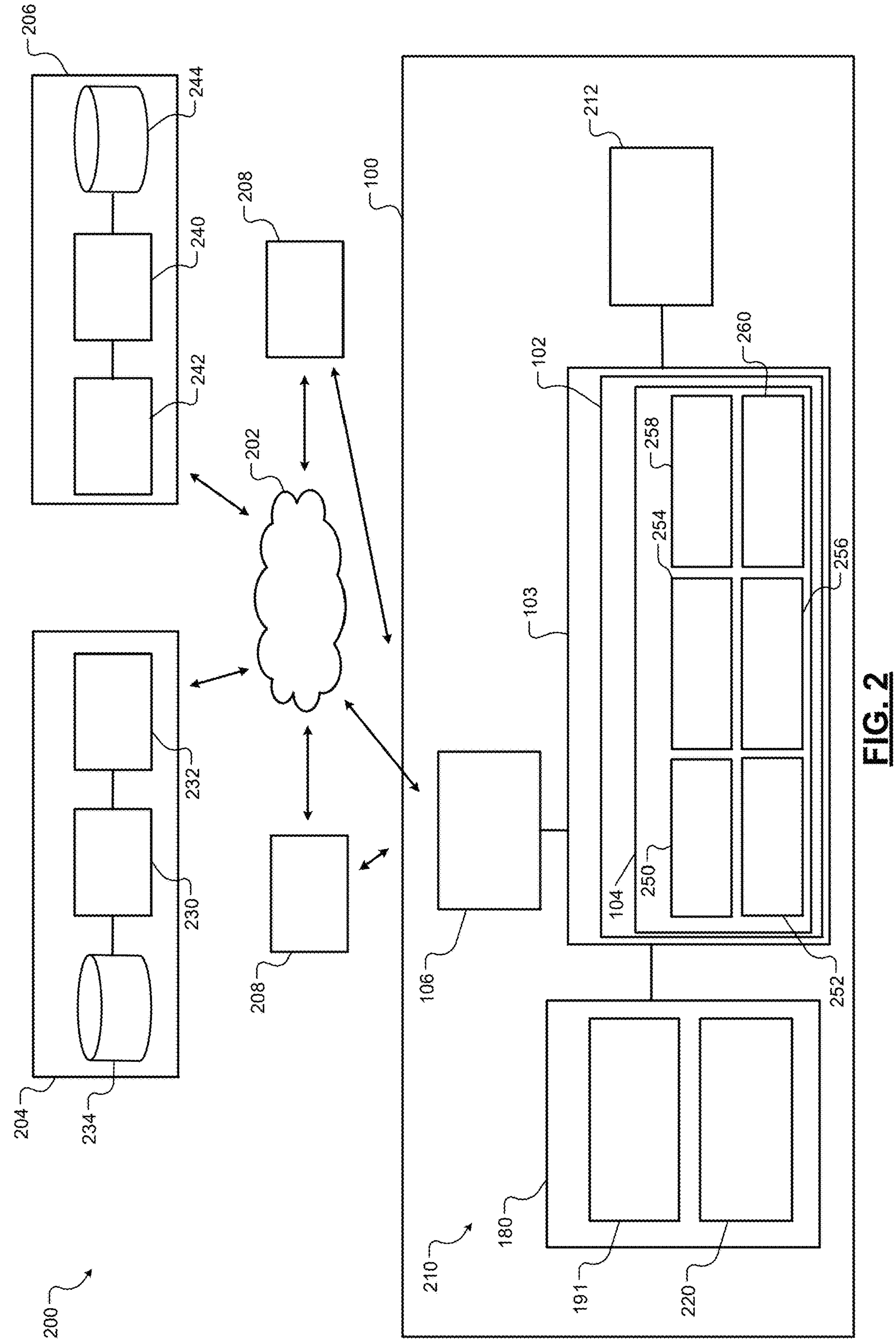
FIG. 2 is a functional block diagram of a communication system including the host vehicle in accordance with the present disclosure.

FIG. 1 shows a host vehicle 100 including an ADAS 101 with a driving assistance module 102 and awareness module 104. The driver assistance module 102 provides driving assistance, which may include automated driving and/or providing driving instructions to a driver. The awareness module 104 provides video, audio and/or haptic information to a driver and/or vehicle occupant indicating critical actions expected to be performed and corresponding benefits, as well as other information. Operations of the driver assistance module 102 and the awareness module 104 are described further below. A portion of the ADAS 101 is shown in FIG. 1 and additional details of the ADAS are shown in FIG. 2.

The host vehicle 100 includes a vehicle control module 103, which as shown includes the driver assistance module 102. The driver assistance module 102 may perform: perception (or situation) determining operations; object detection, identification, classification, and graphical and visual identification operations; data look-up, collection, and gathering operations; interaction timing operations; image display operations; dialog operations including providing speech, video, audio, text, and/or haptic messages; etc. The vehicle control module 103 may perform various operations based on the interaction with the user and the messages, generated as further described below.

The host vehicle 100 further includes one or more power sources 105, a telematics module 106, an infotainment module 107, other control modules 108 and a propulsion system 110. The vehicle control module 103 may control operation of the vehicle 100 including the propulsion system 110. The power sources 105 may include one or more battery packs, a generator, a converter, a control circuit, terminals for high and low voltage loads, etc., as well as one or more battery sensors 111 for detecting states of the power sources 105 including voltages, current levels, states of charge, etc.

The telematics module 106 provides wireless communication services within the host vehicle 100 and wirelessly communicates with service providers, network devices, other vehicles, mobile devices, infrastructure devices, and other devices external and/or internal to the host vehicle 100. The telematics module 106 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 106 may include one or more transceivers 112 and a navigation module 114 with a global positioning system (GPS) and GNSS (or Global Navigation Satellite System) receiver 116. The transceivers 112 wirelessly communicate with network devices internal and external to the host vehicle 100 including cloud-based network devices, central stations, back offices, and portable network devices. The transceivers 112 may perform pattern recognition, channel addressing, channel access control, and filtering operations.

The navigation module 114 executes a navigation application to provide navigation services. The navigation services may include location identification services to identify where the host vehicle 100 is located. The navigation services may also include guiding a driver and/or directing the host vehicle 100 to a selected location. The navigation module 114 may communicate with a central station to collect map information indicating levels of traffic, transportation object identification and locations (e.g., locations and types of signs), path information, where rest areas are located, where gas stations are located, where restaurants are located, etc. As an example, if the host vehicle 100 is an autonomous vehicle, the navigation module 114 may direct the vehicle control module 103 along a selected route to a selected destination. The GPS and GNSS receiver 116 may provide vehicle velocity and/or direction (or heading) of the host vehicle 100 and other vehicles and objects (e.g., pedestrians and cyclists) and/or global clock timing information.

The infotainment module 107 may include and/or be connected to an audio system 122 and/or a video system including one or more displays (one display 120 is shown). The display 120 and audio system 122 may be part of a human machine interface. The displays may include cluster and/or center console displays, head-up displays, etc. Haptic devices 124 (e.g., steering wheel and/or seat vibration devices) may be used in addition to the displays and the audio system 122 to interact with a vehicle occupant such as a driver or passenger. This interaction is further described below. Messages may be displayed, audibly played out, and/or indicated via the display 120, the audio system 122, the haptic devices 124, and/or via one or more other output devices.

The infotainment module 107 may provide various informative, warning, and proactive messages including information regarding: upcoming and currently being performed operations (e.g., braking, accelerating, turning operations), detected objects (or obstacles); upcoming and/or nearby gas stations, upcoming and/or nearby restaurants, music services, upcoming and/or nearby shops, vehicle status information, diagnostic information, prognostic information, entertainment features, etc. The infotainment module 107 may be used to guide a vehicle operator to a certain location, indicate trip estimations (e.g., distances to selected destinations), and other information.

The propulsion system 110 may include one or more torque sources, such as one or more motors and/or one or more engines (e.g., internal combustion engines). In the example shown in FIG. 1, the host vehicle 100 includes an engine 130 and one or more motors 132. The torque sources are independently controlled. The propulsion system 110 includes a motor control system 134 that includes the one or more motors 132 and a motor control module 136 that may control operation of the one or more motors 132 based on signals from the vehicle control module 103.

The modules 103, 104, 107, 108 may communicate with each other via one or more buses 140, such as a controller area network (CAN) bus and/or other suitable interface. The vehicle control module 103 may control operation of vehicle modules, devices and systems based on feedback from sensors 150.

The sensors 150 may include exterior sensors 152, interior sensors 154, and other sensors 156. The exterior sensors 152 may include radar and/or lidar sensors 158 and imaging and audio devices (e.g., visual spectrum cameras, long-wave infrared cameras, short-wave infrared cameras, ambient light sensors, and microphone or microphone array) 160. The exterior sensors 152 may be used to detect objects external to the host vehicle 100 and/or in a path of the host vehicle 100.

The interior sensors 154 may include interior imaging sensors (e.g., cameras) 162 and a microphone or microphone array 164. The interior sensors 154 may be used to monitor a vehicle occupant to detect and track head locations and/or eyes. Location and movement of vehicle occupant head and eyes may be tracked. As an example, the interior sensors 154 may track eyes of a driver and eye gaze direction, detect gestures made by the driver, detect orientation of a body of the driver, detect speech of the driver, etc.

The other sensors 156 may include a vehicle speed sensor 166, acceleration sensors (e.g., longitudinal and lateral acceleration sensors) 168, and a fuel level sensor 170, as shown, and other sensors such as an inclinometer, an engine temperature sensor and an engine oil pressure sensor. Additional sensors may also be included such as brake system sensors (a brake sensor 179 is shown) and steering system sensors (a steering angle sensor 181 is shown).

The vehicle control module 103 may use machine learning for object classification including to identify and/or classify pedestrians, cyclists, and vehicles (e.g., oncoming traffic), as well as for probable trajectory determination of each detected, identified and/or classified object. The vehicle control module 103 may determine the locations of objects based on feedback from the sensors 150.

The vehicle control module 103 may also include a mode selection module 172 and a parameter adjustment module 174. The mode selection module 172 may select a vehicle operating mode. The parameter adjustment module 174 may be used to adjust parameters of the host vehicle 100. The vehicle control module 103 may perform autonomous operations based on interaction with a vehicle occupant. As an example, the vehicle control module 103 may operate in a fully or partially autonomous mode and may control the propulsion system 110, a brake system 176, and a steering system 178. In an embodiment, the vehicle control module 103 controls operation of the systems 110, 176 and 178 based on interactions with a vehicle occupant. The vehicle control module 103 may i) perform autonomous operations such as steering, braking, accelerating, etc., and/or ii) display and/or audibly playout messages, perform haptic operations via haptic devices 124, and/or output messages and/or corresponding signals via one or more human machine interface (HMI) and/or other output devices. An HMI is shown in FIG. 2. The HMIs may include one or more displays, a heads-up display, an audio system, haptic devices, etc.

The host vehicle 100 may further include the memory 180. The memory 180 may store sensor data 182, parameters 184, applications 186, algorithms 188, historical data 190, off-board inputs 191 from other devices external to the host vehicle 100 and other data 192. The parameters may include sensor parameters such as vehicle speed, vehicle acceleration, battery state of charge, fuel level, etc. The applications 186 (e.g., a trip energy estimation application) and other applications and data referred to herein may be stored in the memory 180. The applications 186 may include applications executed by the modules 102, 103, 104, 107, 108.

Although the memory 180 and the vehicle control module 103 are shown as separate devices, the memory 180 and the vehicle control module 103 may be implemented as a single device. The memory 180 may also store historical data 190 and other data 192 such as driver driving patterns, driver fueling patterns, driver stopping patterns, driver pickup patterns, other driver patterns, data collected by and/or generated by at least one of the modules 102, 103, 104, traffic data, navigation data, map data, GPS data, path data, speed data, acceleration data, data from other vehicles and network devices separate from the host vehicle, etc.

The vehicle control module 103 may control operation of the propulsion system 110, the video system including the display 120, the audio system 122, the haptic devices 124, the brake system 176, the steering system 178, a seating system 196, and/or other devices and systems according to parameters set by the modules 102, 103, 104, 107, 108, 174. The vehicle control module 103 may set at least some of the parameters based on signals received from the sensors 150.

The vehicle control module 103 may receive power from the power sources 105, which may be provided to the propulsion system 110, the brake system 176, the steering system 178, the seating system 196, the mirror system 198, etc. Power supplied to the haptic devices 124, the motors 132, the brake system 176, the steering system 178, the seating system 196, and/or actuators thereof may be controlled by the vehicle control module 103 to, for example, adjust: motor speed, torque, and/or acceleration; braking pressure; steering wheel angle; pedal position; state of haptic devices 124; etc. The haptic devices 124 may be located, for example, in a steering wheel of the steering system 178 and/or in seats of the seating system 196. This control may be based on the outputs of the sensors 150, the navigation module 114, the GPS and GNSS receiver 116, the data and information received from external devices, and the data and information stored in the memory 180.

The vehicle control module 103 may determine various parameters including a vehicle speed, a motor speed, a gear state, an accelerator position, a brake pedal position, an amount of regenerative (charge) power, an amount of auto start/stop discharge power, and/or other information. The power sources 105 and/or a control circuit thereof may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values of cells, blocks, packs, and/or groups; temperatures of cells, blocks, packs, and/or groups; current values of cells, blocks, packs, and/or groups; power values cells, blocks, packs, and/or groups; etc.

The acronym "SOX" refers to a state of charge (SOC), a state of health (SOH), state of power (SOP), and/or a state of function (SOF). Power, voltage and/or current sensors may be included separate from and/or in the power sources 105 for SOX determinations. The SOC of a cell, pack and/or group may refer to the voltage, current and/or amount of available power stored in the cell, pack and/or group. The SOH of a cell, pack and/or group may refer to: the age (or operating hours); whether there is a short circuit; whether there is a loose wire or bad connection; temperatures, voltages, power levels, and/or current levels supplied to or sourced from the cell, pack and/or group during certain operating conditions; and/or other parameters describing the health of the cell, pack and/or group. The SOF of a cell, pack and/or group may refer to a current temperature, voltage, and/or current level supplied to or sourced from the cell, pack and/or group, and/or other parameters describing a current functional state of the cell, pack and/or group. The power sources 105 may determine connected configurations of the cells and corresponding switch states as described herein based on the parameters determined by the vehicle control module 103 and/or the control circuit (or module) of the power sources 105. The vehicle control module 103 may control operations of the systems 110, 176, 178 based on the stated parameters. The driving assistance module 102 may display vehicle status information based on the stated parameters.

The host vehicle 100 can include various systems for assisting a driver, for performing autonomous operations, and/or for indicating to a vehicle occupant information regarding an environment of the host vehicle. For example, a host system may include a navigation system that provides map information indicating lane boundaries, street locations, speed limits, geographical locations of selected destinations, etc. The host system may provide the driver with instructions for driving to a selected destination and/or may perform autonomous operations such as braking, steering and accelerating operations to drive the vehicle to the destination based on the map information.

As another example, the host vehicle 100 may include object detection and collision warning systems for detecting impending objects and performing countermeasures and/or taking evasive action to prevent a collision. The vehicle control module 103 determines locations of the objects relative to the host vehicle 100 and trajectories of the objects and the host vehicle 100. If it is determined that the host vehicle 100 is likely to collide with one of the objects, one or more warning signals may be generated to indicate to the driver and/or the object of concern of the potential collision. These warnings may be provided in addition to digital gateways and other information described herein. The vehicle control module 103 may also or alternatively perform one or more other countermeasures (e.g., apply brakes to decelerate the host vehicle, change a steering angle of the host vehicle, etc.) to prevent a collision.

FIG. 2 shows a communication system 200 including the host vehicle 100, a distributed communications system 202, a cloud-based network device 204, a back office 206, and other vehicles 208. A portion 210 of the ADAS 101 of FIG. 1 is shown. The portion 210 includes the vehicle control module 103, the telematics module 106, the memory 180, a HMI 212. The vehicle control module 103 includes the driving assistance module 102, which may include the awareness module 104. The awareness module 104 may include a critical action module 250, a traffic module 252, a FFEP module 254, a metric module 256, a cutoff module 258 and a notification module 260. The HMI 212 may be implemented as part of the infotainment system of FIG. 1.

The memory 180 includes the off-board inputs 191 and on-board inputs 220. The off-board inputs 191 may include: GPS information; information received via the Internet; and/or information received via V2X communication, wireless fidelity (Wi-Fi) communication, cellular communication, and/or satellite communication. The off-board inputs 191 may include information received from the cloud-based network device 204, the back office 206, and/or other vehicles 208. The on-board inputs 220 may include automated driving system status information, vehicle braking information, steering angle information, object detection information, vehicle acceleration information, information from on-board sensors referred to herein, etc.

The cloud-based network device 204 may include a control module 230, a transceiver 232, and a database 234. One or more cloud-based network devices may be included and include one or more edge devices. The back office 206 may include a control module 240, a transceiver 242, and a database 244.

The critical action module 250 determines critical actions to be performed. The critical action module 250 may receive critical action requests from a vehicle occupant and/or may determine a critical action to be performed based on, for example, a planned destination, a planned path of the host vehicle, traffic information, detection of nearby objects (e.g., vehicles, pedestrians, cyclists, etc.), traffic lights, intersections, traffic lanes, state of charge of a power source, an amount of fuel remaining in fuel tank, etc.

The traffic module 252 may execute an algorithm to identify object trajectories of nearby objects. This may include determining the likelihood that an object trajectory and a trajectory of the host vehicle will cross. This may also include determining numbers and locations of objects nearby and in or will be in an intended path of the host vehicle.

The FFEP module 254 determines FFEPs as described herein. The metric module 256 determines favorability and feasibility metrics for each of the FFEPs as described herein. In an embodiment, the metric module 256 may allow a vehicle occupant to set favorability and feasibility thresholds, which may be minimum thresholds that are to be reached and/or exceeded in order to perform the corresponding critical action. Different types of critical actions may have different set favorability and feasibility metrics. The cutoff module 258 determines cutoff conditions for performing critical actions. The cutoff conditions may include distance, speed, location, etc. conditions, which when passed or exceeded, a critical action can no longer be performed due to, for example, physical limitations of host vehicle, safety concerns, the host vehicle passing a certain location, etc. The notification module 260 notifies vehicle occupants of planned critical actions to perform, associated benefits, locations where critical actions are to be performed including beginning, intermediate and end locations, etc. The notifications may include video, audio and/or haptic messages. In an embodiment, the notification module 260 displays a visual representation of the planned critical action. This may be provided on a display internal to the vehicle, such as a display on a dashboard or a center console, or may be provided via a heads-up display as an augmented reality image seen when viewing an environment external to the vehicle. For example, the image may be provided via a windshield of the host vehicle.

The awareness module 104 may utilize computer vision, machine learning, V2X communication, and cloud computing to perform operations of the modules 250, 252, 254, 256, 258, 260. Awareness optimization for expected critical actions at intermediate distances from the host vehicle may be implemented for a range of critical actions. A supported critical action may be indicated by the driver and/or an ADAS and/or autonomous vehicle (AV) functionality.

Although some example critical actions are described herein for performing a lane change due to the need of turning and/or to make an expected green passing advantage, the examples disclosed herein may be applied to other critical actions. Actions (or processing operations) are also performed subsequent to performing a critical action, which may be organized into two main functionalities i) metrics calculation, and ii) driver and/or occupant notifications. As another example, a critical action may include a host vehicle changing lanes, for example, from a left lane to a right lane in order to be able to make an upcoming right turn.

Figure 3:
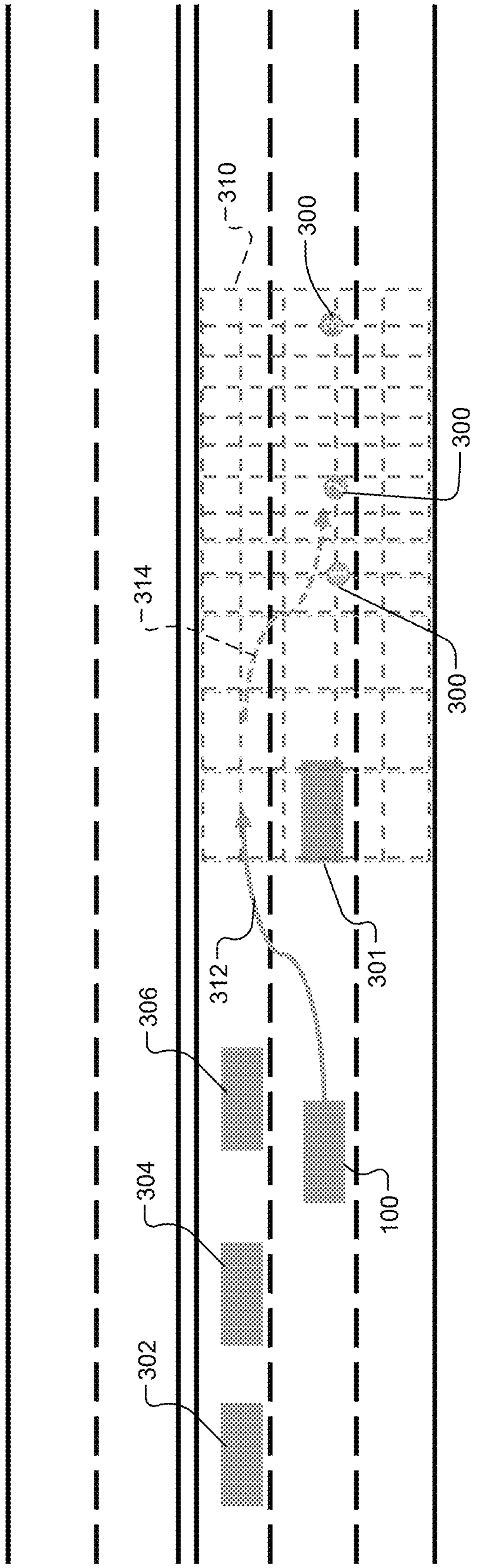
FIG. 3 is a top view of the host vehicle performing a passing critical action based on favorability and feasibility metric evaluation points (FFEPs) in accordance with the present disclosure.

FIG. 3 shows the host vehicle 100 of FIGS. 1-2 performing a passing critical action based on FFEPs (represented by circles 300 with numerical designators 1, 2, and 3). The awareness module 104 evaluates which location is a best location to perform the critical action of overtaking a front vehicle 301 by the host vehicle 100 while recognizing presence of nearby vehicles 302, 304, 306 in a passing lane. The three vehicles 302, 304, 306 may be about to pass the host vehicle 100. At this time instant it is evaluated that, among the three marked locations 1, 2, 3, location 1 has a highest favorability metric but a lowest feasibility metric, location 3 has a lowest favorability metric but a highest feasibility metric, and location 2 has a best trade-off between the favorability and feasibility metrics. As a result, location 2 is determined to be the best location (highest ranked FFEP) to perform the indicated critical action. A vicinity range area 310 to the marked locations 1, 2, 3 is more densely sampled to evaluate the metrics since the best location is more likely to be inside this vicinity range area 310 than outside. The passing operation may include the host vehicle 301 accelerating to move in front of the vehicles 302, 304, 306 and passing the front vehicle 301, as represented by arrows 312, 314.

The following FIGS. 4-7 illustrate example main stages to prepare and perform an example critical action (e.g., overtaking a front vehicle on a current lane) with awareness optimization performed.

Figure 4:
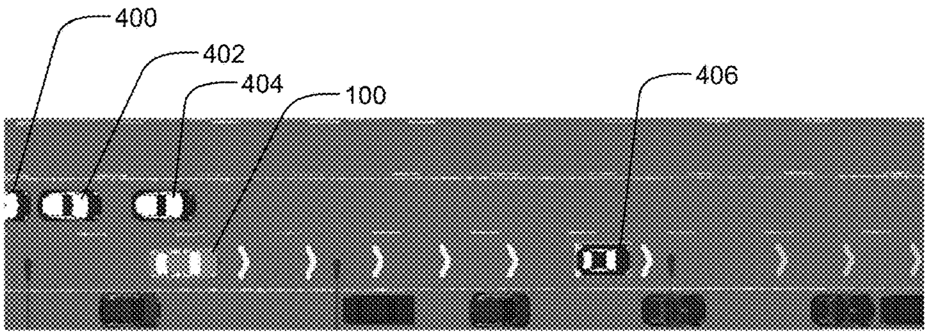
FIG. 4 is a top view of a host vehicle determining a highest ranked FFEP to be at a certain location at which the host vehicle will be overtaken by three passing vehicles in accordance with the present disclosure.

FIG. 4 shows the host vehicle 100 determining a highest ranked FFEP to be at a certain location at which the host vehicle will be overtaken by three passing vehicles. The highest-ranked FFEP is determined to be a certain location at which the host vehicle 100 will be overtaken by the three vehicles 400, 402, 404 driving on the left lane, when the host vehicle 100 is at an intermediate distance (or set distance) to the highest-ranked FFEP for passing a front vehicle 406. The set distance may be set by a driver and/or the awareness module 104. The critical action may include waiting for the vehicles 400, 402, 404 to pass.

Figure 5:
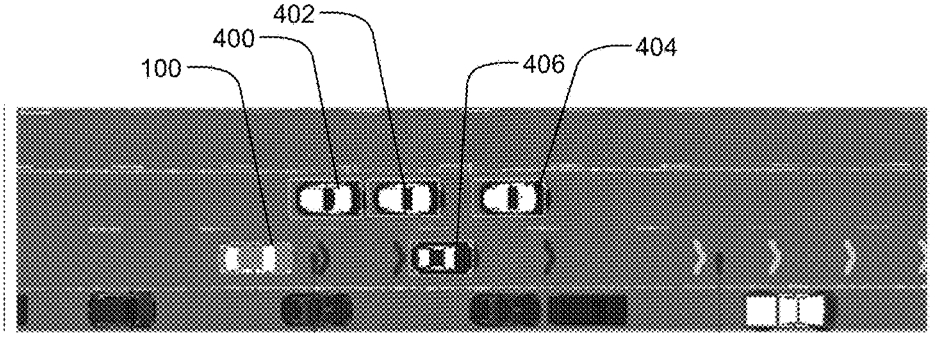
FIG. 5 is a top view of the host vehicle requesting vehicle occupant to be in high attention for a forthcoming critical action to be performed when the host vehicle is a short distance from a highest ranked FFEP in accordance with the present disclosure.

FIG. 5 shows the host vehicle 100 requesting a vehicle occupant to be in high attention toward a forthcoming critical action to be performed when the host vehicle 100 is a short distance (a distance shorter than the intermediate distance) to a highest ranked FFEP. This may include creating a notification alerting the vehicle occupant of the critical action to be performed to pass the front vehicle 406, the intended path of the host vehicle 100, the benefit of performing the critical action, indication of the locations of the vehicles 400, 402, 404, etc.

Figure 6:
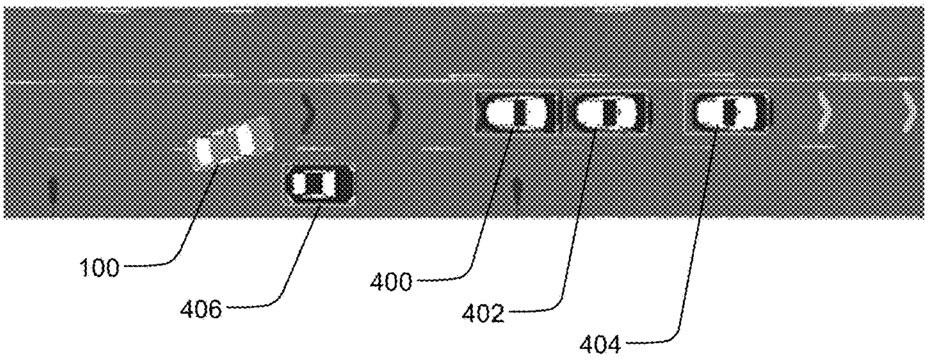
FIG. 6 is a top view of the host vehicle implementing a critical action when the host vehicle is a very short distance from a highest ranked FFEP in accordance with the present disclosure.
Figure 7:
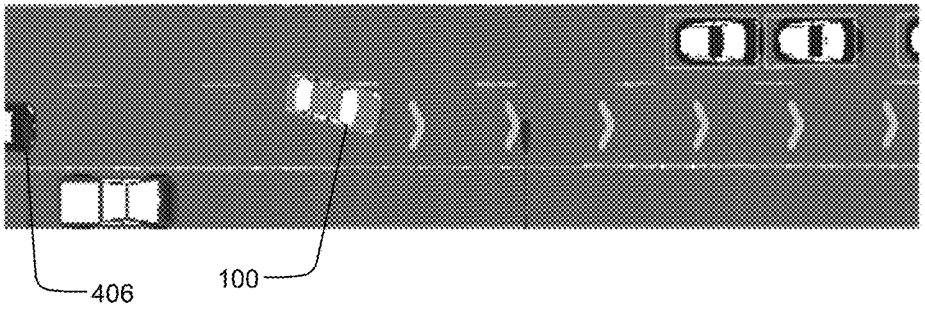
FIG. 7 is a top view of the host vehicle after implementing a critical action in accordance with the present disclosure.

FIG. 6 shows the host vehicle 100 implementing a critical action to pass the front vehicle 406 when a very short distance (or distance shorter than the short distance referred to with respect to FIG. 5) to a highest ranked FFEP. The critical action is performed when the host vehicle 100 is the very short distance away from the highest-ranked FFEP. This passing operation is being performed after the vehicles 400, 402, 404 have passed the host vehicle 100 and the front vehicle 406. FIG. 7 shows the host vehicle 100 after passing the front vehicle and returning to the original lane of the host vehicle, which is the lane in which the front vehicle 406 is located.

Figure 8:
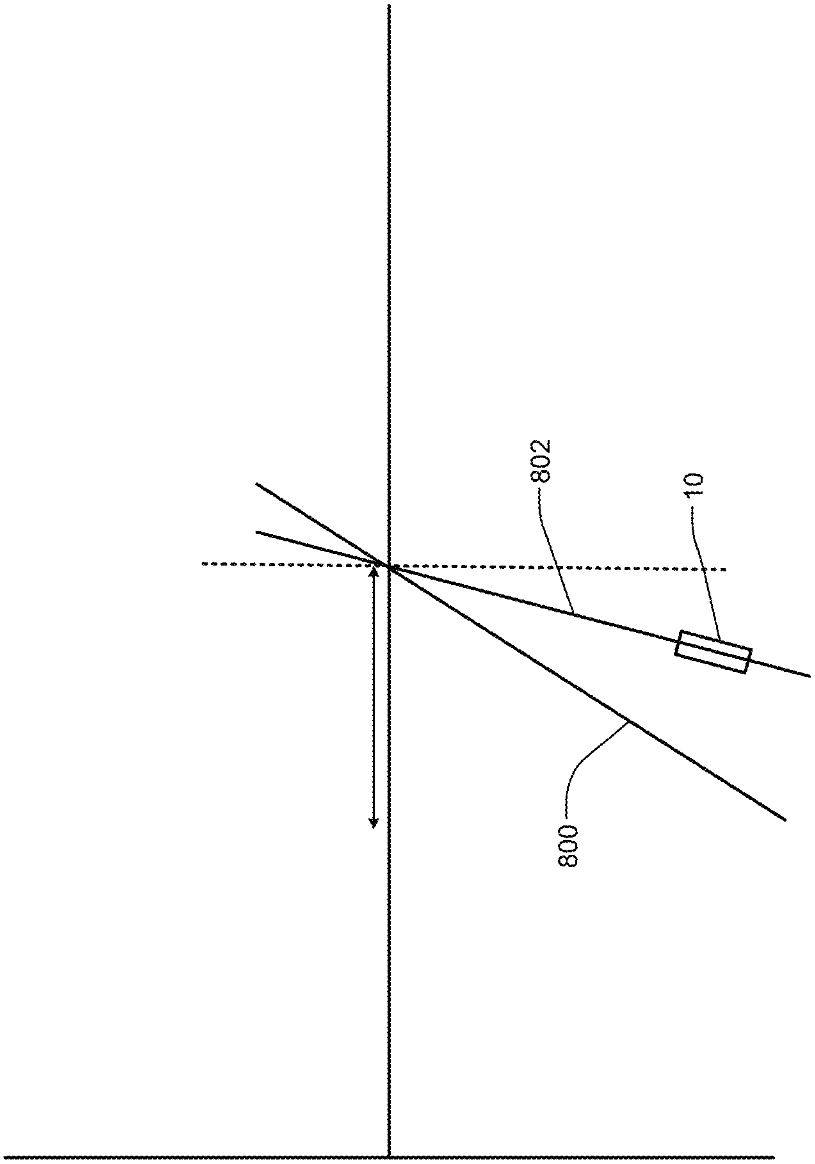
FIG. 8 is a plot of location versus time illustrating a situation when the host vehicle has passed a cutoff threshold for being able to perform a critical action in accordance with the present disclosure.

FIG. 8 shows a plot of location versus time illustrating a situation when the host vehicle 100 has passed a cutoff threshold for being able to perform a critical action. Line 800 represents an upper speed limit. Line 802 is a slope line corresponding to an average speed for the host vehicle 100 to be able to make a cutoff location (e.g., through an intersection before a traffic light of the intersection changes from green to red). In this situation, the average speed of the host vehicle 100 to make the green light is higher than the upper speed limit and thus the host vehicle has passed a speed limit cutoff condition and thus is not permitted to perform the critical action needed to make the green light. The line 800 may be referred to as a cutoff spatial-temporal slope line, which when passed, the host vehicle 100 is no longer permitted to perform the critical action. Other cutoff spatial-temporal slope lines for other cutoff conditions may also be implemented. The awareness module 104 may prevent the host vehicle from performing a critical action when a corresponding cutoff spatial-temporal slope line has been exceeded. In the example shown, this occurs when the slope of the location versus time line of the host vehicle 100 to make the light is steeper than the slope of the cutoff spatial-temporal slope line 800.

Figure 9A:
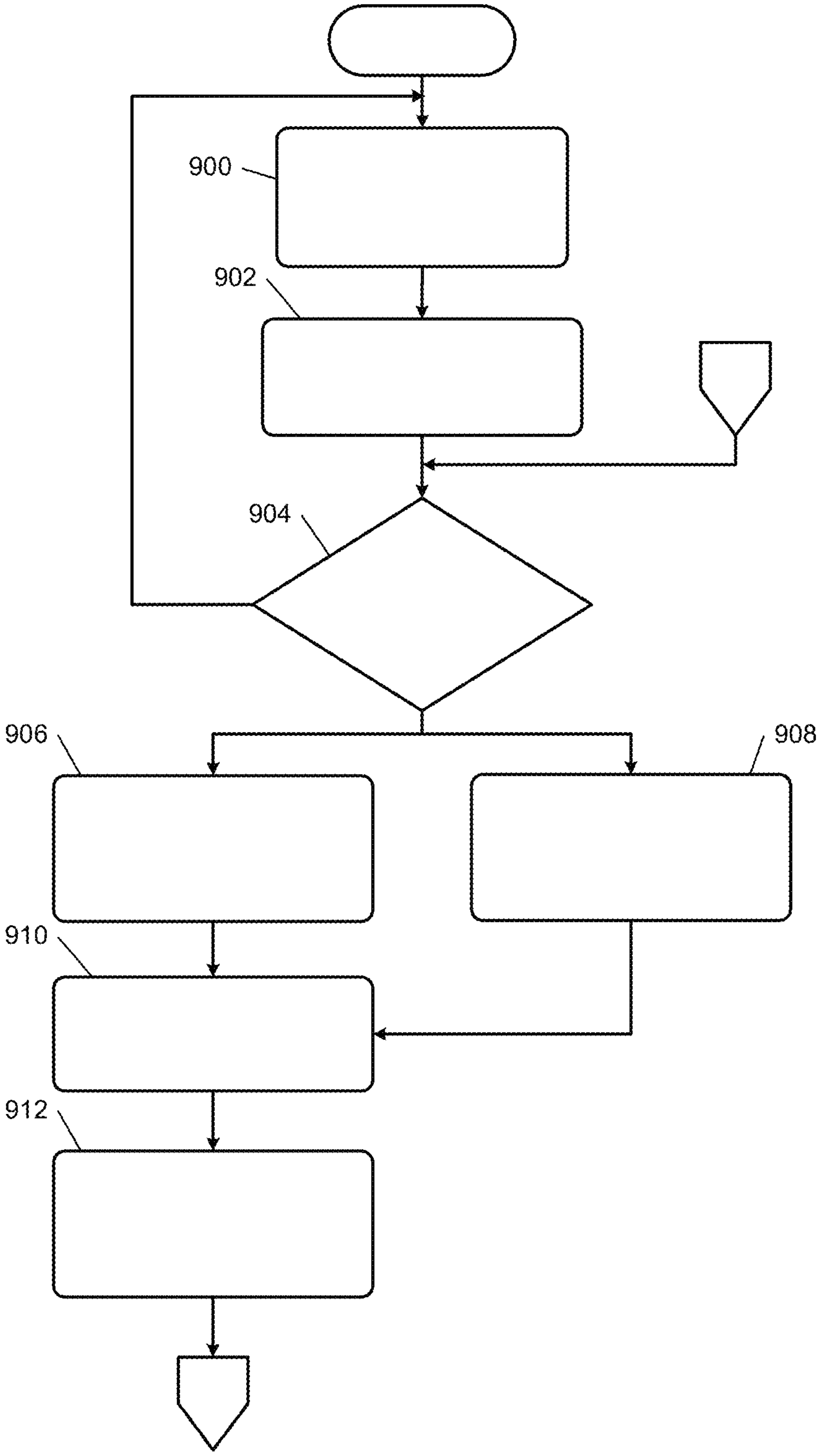
FIGS. 9A-9B (collectively FIG. 9) illustrates an example awareness method in accordance with the present disclosure.
Figure 9B:
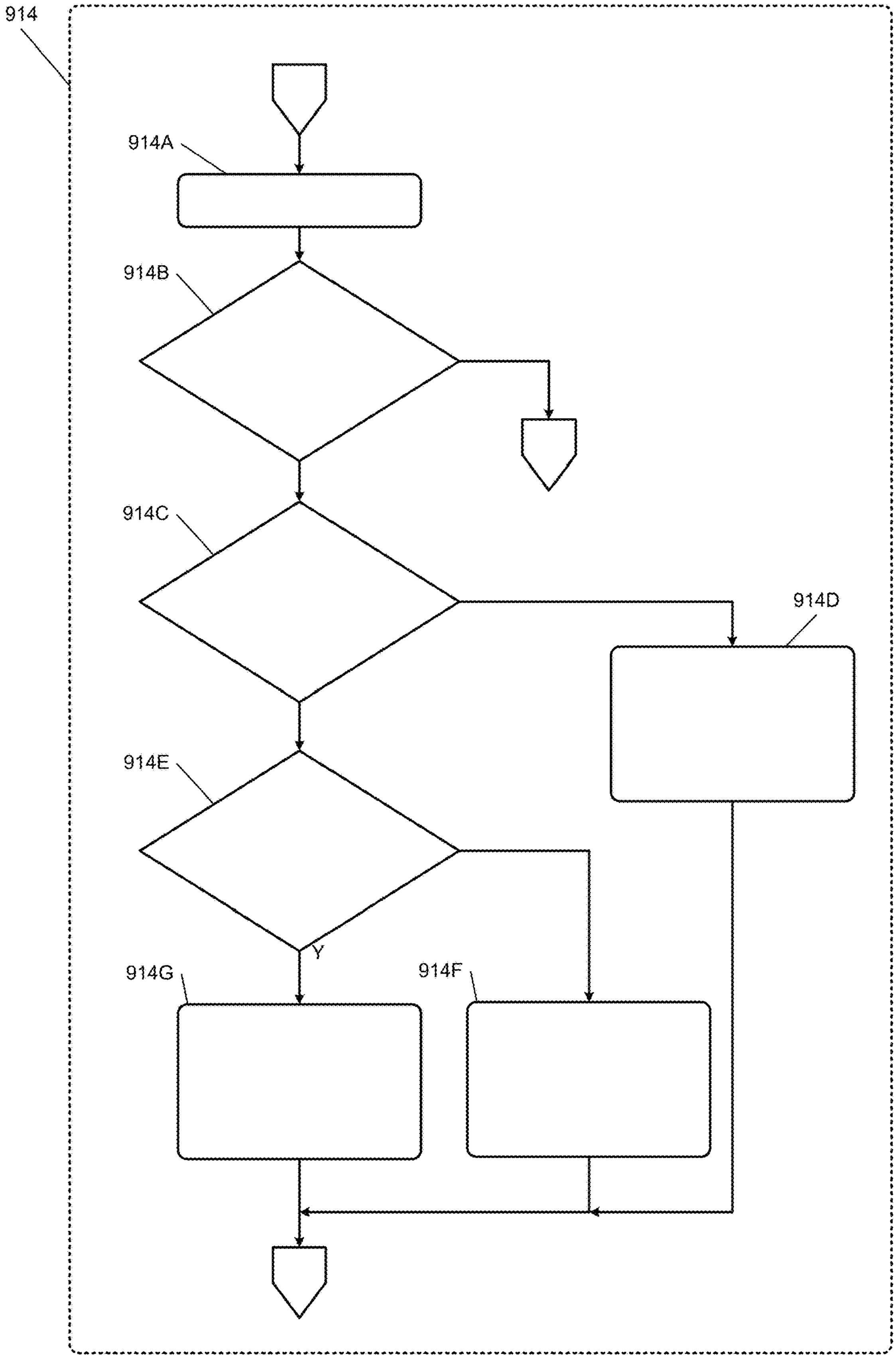

FIG. 9 shows an example awareness method. The method includes processing operations for driver and/or occupant awareness optimization. This includes performing the functionalities of metrics calculation and driver and/or occupant notification with iterations conditioned on the pending status of a critical action. The following operations may be iteratively performed. The following operations include calculating favorability and feasibility metrics for FFEPs and may be performed by the modules 102, 103, 104, 250, 252, 254, 256, 258, 260 of FIGS. 1-2.

At 900, the critical action module 250 determines or receives a critical action to potentially be performed to provide a corresponding benefit.

At 902, the cutoff module 258 determines one or more cutoff condition(s) (or threshold(s) for the critical action expected to be performed.

Upon the indication of the expected critical action, the cutoff module 258 determines its cutoff condition (cutoff time, cutoff location, cutoff slope line on the spatial-temporal plane etc., or some combination thereof) if applicable, to delimitate the feasible spatial-temporal range for the corresponding ADAS to perform the awareness optimization for the indicated critical action. To give examples in an intuitive sense, the cutoff condition of "lane change due to the need of turning" is mainly upon "reaching the location with a short distance (~20 meters) before the intersection", and the one of "lane change due to the expected green passing advantage" is mainly upon "reaching the cutoff spatial-temporal slope line determined by the traffic light signal timing and speed limits". To make timely and meaningful notifications for awareness optimization, the cutoff module 258 checks that the host vehicle 100 has not went beyond the cutoff condition(s) of the expected critical action.

At 904, the awareness module 104 determines whether at least one of i) the critical action has been performed, and ii) one or more of the cutoff conditions have been satisfied. If yes, operation 900 may be performed, as shown, or the method may end. If not, operations 906 and 908 may be performed. The critical action may be performed and/or the driver may be instructed to perform the critical action when, for example, the host vehicle is at highest-ranked FFEP and the one or more cutoff condition(s) are not satisfied. In an embodiment, when the one or more cutoff conditions are satisfied, no notification is given as it is too late to perform the critical action.

At 906, the FFEP module 254 determines a benefit anticipation location (BAL) and initializes a series of FFEPs for the critical action. Initialization of the discrete spatial points within appropriate distance ahead is performed. This may occur subsequent to operations 900, 902, 904, provided that there is currently enough margin to the cutoff condition (s) of the expected critical action. Typically, the FFEP module 254 determines some fixed spatial point appropriately ahead of a cutoff location as a BAL, and near-uniformly selects a series of spatial points between the host vehicle's current location and the BAL as the FFEPs pertaining to the critical action.

The BAL is the spatial location where an associated benefit is provided. The BAL serves as a reference location for evaluating the favorability metric, e.g., in the case of "lane change due to the expected green passing advantage", the difference of travelling time between whether or not this critical action is performed is evaluated with the intended intersection being chosen as the BAL. In an embodiment and, depending on the specific critical action, the margin to the cutoff condition(s) is considered upon a most stringent relevant metric, such as among remaining time, remaining distance, perpendicular distance to the cutoff spatial-temporal slope line etc., whichever being the most imminent to approach 0.

For each FFEP, the favorability may be defined as the expected benefit after performing the critical action (e.g., the reduction of travelling time and energy consumption in the forthcoming trip range). The feasibility may be defined as the ease to perform the critical action (e.g., the estimated probability of success).

At 908, the traffic module 252 acquires KITPI and MTFI for the relevant spatial-temporal range. The KITPI and MTFI which are relevant to the FFEPs are acquired. The acquisition of KITPI and MTFI may be based on filtering over appropriate spatial-temporal range and parsing i) the relevant data fields of the connectivity messages received by the host vehicle 100 through, for example, V2V, V2I and V2N channels, and/or ii) data from onboard sensors. The sensor data may be pre-processed data.

In an embodiment, for the calculation of each FFEP's favorability and feasibility metrics, the KITPI serves as a main input, which is dynamically delimitated as pertaining to up to three vehicles per lane in vicinity of a host vehicle for effectively and succinctly capturing most impactful traffic participants. In addition, the MTFI is used to make minor adjustments to the metrics.

At 910, the FFEP module 254 evaluates metrics of FFEPs based on the KITPI and MTFI. Calculating the favorability and feasibility metrics for the selected FFEPs may include the following. The calculation of feasibility may involve: i) evaluating the spatial probability distribution of each key impacting traffic participant (based on the acquired KITPI within certain past time duration) when the host vehicle reaches the FFEP; ii) evaluating the estimated probability of success of the critical action based on these probability distributions; and applying some minor correction of this probability of success incurred by the relevant MTFI. The calculation of favorability may be performed based on evaluating a difference of the main impacted trip metrics (e.g., travelling time and energy consumption in an appropriate trip range beyond the FFEP and/or toward the BAL) for situations with and without performing the critical action.

Since it is possible to evaluate the favorability and feasibility metrics for the already reached FFEP with sufficiently high confidence, it is therefore possible to train the deep learning model(s) for the metric calculation, where the inputs include: the KITPI and MTFI provided in a past duration and/or iteration; host vehicle status parameters and distance to the FFEP; static road topology parameters; etc.

At 912, the FFEP module 254 ranks FFEPs based on the corresponding favorability and feasibility metrics and updates the series of FFEPs. Updating the series of FFEPs and determining the stage of the driver and/or occupant notifications is based on the favorability and feasibility metrics results together with the current margin to the cutoff condition, provided that the margin is not too small. The FFEP module 254 ranks the FFEPs based on their respective favorability and feasibility metrics with possible involvement of a certain combined single metric in conjunction with the driver and/or occupant preference(s). The FFEP module 254 updates the series of FFEPs based on the rule that the higher ranked FFEPs correspond to denser allocation of new FFEPs in their vicinities. The FFEP module 254, based on certain pre-defined thresholds of the host vehicle's distance to the highest-ranked FFEP, has the distance directly mapped into one of the disclosed notification stages (which is further described below) for notifying the driver and/or occupant.

The ranking of the FFEPs, especially with the involvement of the driver and/or occupant preference may be performed based on deep learning with the deep learning model trained based on the host vehicle's historical data. The historical data includes favorability and feasibility metric values for past actually taken critical actions. The model may also be trained based on favorability and feasibility metric values of candidate FFEPs and the incorporation of certain static road factors such as intersection, merge points, and lane layout.

Updating the series of FFEPs can also be performed based on deep learning, with the deep learning model being trained based on offline big data and crowd-sourcing online data according to the KITPI, MTFI and special events, and the incorporation of certain prominent rules (e.g., higher traffic flow density should lead to denser FFEPs for accurate metric calculation; certain special events, accidents and traffic jam according to MTFI can lead to lower possibilities to guide the HV toward the impacted (or relevant geographical) area).

At 914, the notification module 260 notifies a vehicle occupant via the HMI of the favorability and feasibility metrics for at least the highest ranked FFEP, critical action, expected benefit of the critical action, and expected location when critical action with be performed, and expected location when critical action will end. The notification module 260 may notify the vehicle occupant of the favorability and feasibility metrics for other ones of the FFEPs. This may include illustrating the expected path of the host vehicle relative to the current environment and surrounding objects. In an embodiment, the driver and/or occupant notifications are provided in three stages. In an embodiment, two predefined threshold values are used to determine the stage of notification based on a distance that the host vehicle is to the highest-ranked FFEP.

At 914A, the notification module 260 determines a highest ranked FFEP.

At 914B, the notification module 260 determines whether the host vehicle has reached a first (intermediate) distance from highest ranked FFEP. If not, operation 904 may be performed. If yes, operation 914C may be performed. The awareness module 104 may return to operation 904 for a new iteration of metrics calculation if the host vehicle has not gone beyond and/or exceeded the one or more cutoff conditions and the critical action has not yet been performed. Otherwise, the awareness module 104 may stop the current metrics calculation session and monitor for a new indication of an expected critical action.

At 914C, the notification module 260 determines whether the host vehicle has reached a second (or short) distance from the highest ranked FFEP. If not, operation 914D may be performed, otherwise operation 914E may be performed.

At 914D, the notification module 260 conveys immersive notification showing critical action pending at appropriate distance and an illustration of the highest ranked FFEP. For intermediate distance to the highest-ranked FFEP: the notification module 260 conveys an immersive notification (e.g., augmented reality images) showing the indicated critical action pending at appropriate distance, together with some illustration of the highest-ranked FFEP. The immersive notification may include displaying a map showing the host vehicle and other nearby objects and a planned path to be followed by the host vehicle when performing the critical action.

At 914E, the notification module 260 determines whether the host vehicle 100 has reached a third (or very short) distance from the highest ranked FFEP. If not, operation 914F may be performed, otherwise operation 914G may be performed.

At 914F, the notification module 260 calls for driver/occupant attention when the host vehicle is highly likely to reach the highest ranked FFEP. For a short distance to the highest-ranked FFEP: the notification module 260 calls for attention when it is highly likely the host vehicle will reach the highest-ranked FFEP that is close ahead.

At 914G, the notification module 260 calls for imminent action of driver or conveys a warning about action being performed by the ADAS. For a very short distance to the highest-ranked FFEP: the notification module 260 calls for imminent action of the driver, or conveys warning about the action being performed by the ADAS, subject to real-time situation; in certain automated driving mode, the ADAS may stop the host vehicle into a sidewalk or urgent lane of the road (e.g., a shoulder of the road), and disengage to hand control over to the driver.

Operation 904 may be performed subsequent to performing either of operations 914F and 914G. The awareness module 104 may return to operation 904 for a new iteration of metrics calculation if the host vehicle 100 has not gone beyond and/or exceeded the one or more cutoff conditions and the critical action has not yet been performed. Otherwise, the awareness module 104 may stop the current metrics calculation session and monitor for a new indication of an expected critical action.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The facilitation for the driver to optimally achieve some expected benefit at an intermediate distance, or reassurance for the occupant in an explainable and timely manner about the automated driving system's maneuverings to achieve the expected benefit, is performed based on evaluating which location at some intermediate distance ahead is the best for carrying out the benefit-achieving critical action. This is done together with the corresponding notifications in several stages based on the host vehicle's distance to the evaluated best location for the critical action.

In the above-describe examples, the evaluation of which location is best for carrying out a critical action is based on iterative evaluations of the favorability and feasibility metrics for a series of spatial points (i.e., the FFEPs), and after each iteration, the series of FFEPs is refreshed based on the favorability and feasibility metric results to optimize computing power allocation.

The information regarding the traffic participants in the host vehicle's vicinity, together with the information regarding the traffic flow in a broader range, are used toward the evaluations of the favorability and feasibility metrics as inputs. The inputs may include the KITPI indicating the nearby vehicles' status (speed, acceleration, lane position, steering angle etc.) within a past duration. The inputs may further include the MTFI indicating how the interested area within some intermediate distance ahead is dynamically populated with vehicles (e.g., statistical results about the vehicles' lane change actions, trends of the vehicle number and flow densities per lane etc.). The KITPI and MTFI may be provided by the connectivity messages and/or onboard sensors.

The examples disclosed herein include an approach to determine and notify the driver or occupant regarding the best location to perform an expected critical action that will achieve certain benefit in driving. This is done such that the driver and/or occupant is better aware of the driver's or system's maneuvering decision, which incorporates the insights provided by the system about the surrounding traffic. The examples disclosed herein include evaluation of favorability and feasibility metrics for dynamically assigned FFEPs, based on which notifications are made to a driver and/or occupant to have better awareness toward forthcoming critical actions that will achieve certain benefits in driving. Learning-based operations are optionally performed including operations to optimize driver and/or occupant notifications.

By informing the driver of a host vehicle of critical actions to be performed by the host vehicle and surroundings of the host vehicle, the driver is better aware of this information and can intervene if desired and either modify the critical actions being performed, accept or deny the expected critical actions, and/or take over control of the host vehicle. The disclosed examples aid in maintaining a driver and/or vehicle occupant in a state of constant awareness of surroundings and actions to be performed. The ADAS makes a driver aware of what critical actions are able to be done in a given situation and allows the driver to: acquiesce to default critical actions selected by the ADAS; select a critical action; provide a requested critical action; modify a critical action; and/or change the critical action. This may be done by interacting with the ADAS, for example, via the HMI. The critical actions (or maneuvers) may be explained to the vehicle occupant for clear understanding and awareness purposes. The notifications reassure occupant of actions to be performed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A driving assistance system of a host vehicle, the driving assistance system comprising:

a telematics module configured to receive messages from one or more network devices separate from the host vehicle;

a driving assistance module configured to receive on-board sensor data; and an awareness module configured to i) determine a critical action to perform, ii) determine a series of favorability and feasibility metric evaluation points (FFEPs), iii) based on the messages and the on-board sensor data, evaluate and rank favorability and feasibility metrics for each of the FFEPs to determine a highest ranking FFEP, and iv) based on the highest ranking FFEP, notify an occupant of the host vehicle of the critical action expected to be performed and information regarding the critical action expected to be performed, wherein each of the favorability metric evaluation points is defined as an expected benefit after performing a corresponding critical action, and each of the feasibility metric evaluation points is defined as an estimated probability of success in performing the corresponding critical action of the one of the favorability metric evaluation points associated with that feasibility metric evaluation point.

2. The driving assistance system of claim 1, wherein the awareness module is configured to i) determine at least one benefit for performing the critical action, and ii) inform the occupant of the at least one benefit.

3. The driving assistance system of claim 1, wherein:

the messages comprise at least one of i) key impacting traffic participant information (KITPI), and ii) macroscopic traffic flow information (MTFI); and the awareness module is configured to evaluate and rank the favorability and feasibility metrics based on the at least one of the KITPI and the MTFI.

4. The driving assistance system of claim 1, wherein:

the on-board sensor data comprises at least one of i) key impacting traffic participant information (KITPI), and ii) macroscopic traffic flow information (MTFI); and the awareness module is configured to evaluate and rank the favorability; and feasibility metrics based on the at least one of the KITPI and the MTFI.

5. The driving assistance system of claim 1, wherein:

the awareness module is configured to implement a three-stage notification process including i) providing first notification when the host vehicle is at a first distance from the highest ranking FFEP, ii) providing second notification when the host vehicle is at a second distance from the highest ranking FFEP, and iii) providing a third notification when the host vehicle is at a third distance from the highest ranking FFEP;

the second notification is different than the first notification and the third notification;

the third notification is different than the first notification;

the second distance is shorter than the first distance; and the third distance is shorter than the second distance.

6. The driving assistance system of claim 5, wherein:

the first notification comprises the critical action expected to be performed and an illustration of the highest ranking FFEP;

the second notification comprises request for attention associated with high likelihood that the host vehicle is to reach the highest ranking FFEP; and the third notification comprises a request for imminent action of occupant or a warning about action being performed by the driving assistance system.

7. A driving assistance system of a host vehicle, the driving assistance system comprising:

a telematics module configured to receive messages from one or more network devices separate from the host vehicle;

a driving assistance module configured to receive on-board sensor data; and an awareness module configured to i) determine a critical action to perform, ii) determine a series of favorability and feasibility metric evaluation points (FFEPs), iii) based on the messages and the on-board sensor data, evaluate and rank favorability and feasibility metrics for each of the FFEPs to determine a highest ranking FFEP, and iv) based on the highest ranking FFEP, notify an occupant of the host vehicle of the critical action expected to be performed and information regarding the critical action expected to be performed, wherein the awareness module is configured to determine one or more cutoff conditions for the critical action, and based on whether the one or more critical actions have been satisfied, determine a benefit anticipation location for the critical action and initialize determination of the series of FFEPs.

8. The driving assistance system of claim 1, wherein the awareness module is configured to update the series of FFEPs based on favorability and feasibility metrics of the series of FFEPs.

9. The driving assistance system of claim 1, wherein the awareness module is configured to iteratively update the critical action based on whether a previous critical action has been performed or one or more cutoff conditions have been satisfied.

10. The driving assistance system of claim 1, wherein the awareness module is configured to evaluate which location is best to carry out the critical action based on iterative evaluation of the favorability and feasibility metrics.

11. A driving assistance method for a host vehicle, the driving assistance method comprising:

receiving messages at the host vehicle from one or more network devices separate from the host vehicle;
receiving on-board sensor data at a control module of the host vehicle;
determining a critical action to perform;
determining a series of favorability and feasibility metric evaluation points (FFEPs);
based on the messages and the on-board sensor data, evaluating and ranking favorability and feasibility metrics for each of the FFEPs to determine a highest ranking FFEP;
based on the highest ranking FFEP, notifying an occupant of the host vehicle of the critical action expected to be performed and information regarding the critical action expected to be performed; and
implementing a three-stage notification process including i) providing first notification when the host vehicle is at a first distance from the highest ranking FFEP, ii) providing second notification when the host vehicle is at a second distance from the highest ranking FFEP, and iii) providing third notification when the host vehicle is at a third distance from the highest ranking FFEP,
wherein
the second notification is different than the first notification and the third notification,
the third notification is different than the first notification,
the second distance is shorter than the first distance, and
the third distance is shorter than the second distance.

12. The driving assistance method of claim 11, further comprising:
determining at least one benefit for performing the critical action; and
informing the occupant of the at least one benefit.

13. The driving assistance method of claim 11, wherein:
the messages comprise at least one of i) key impacting traffic participant information (KITPI), and ii) macroscopic traffic flow information (MTFI); and
the favorability and feasibility metrics are evaluated and ranked based on the at least one of the KITPI and the MTFI.

14. The driving assistance method of claim 11, wherein:
the on-board sensor data comprises at least one of i) key impacting traffic participant information (KITPI), and ii) macroscopic traffic flow information (MTFI); and
the favorability; and feasibility metrics are evaluated and ranked based on the at least one of the KITPI and the MTFI.

15. The driving assistance method of claim 11, wherein:
the first notification comprises the critical action expected to be performed and an illustration of the highest ranked FFEP;
the second notification comprises request for attention associated with high likelihood that the host vehicle is to reach the highest ranked FFEP; and
the third notification comprises a request for imminent action of occupant or a warning about action being performed by a driving assistance system of the host vehicle.

16. The driving assistance method of claim 11, further comprising:
determining one or more cutoff conditions for the critical action; and
based on whether the one or more critical actions have been satisfied, determining a benefit anticipation location for the critical action and initializing determination of the series of FFEPs.

17. The driving assistance method of claim 11, further comprising updating the series of FFEPs based on favorability and feasibility metrics of the series of FFEPs.

18. The driving assistance method of claim 11, further comprising iteratively updating the critical action based on whether a previous critical action has been performed or one or more cutoff conditions have been satisfied.

19. The driving assistance method of claim 11, further comprising evaluating which location is best to carry out the critical action based on iterative evaluation of the favorability and feasibility metrics.

* * * * *